Feb. 7, 1961
C. JONES
2,970,851
HITCH
Filed Sept. 2, 1960
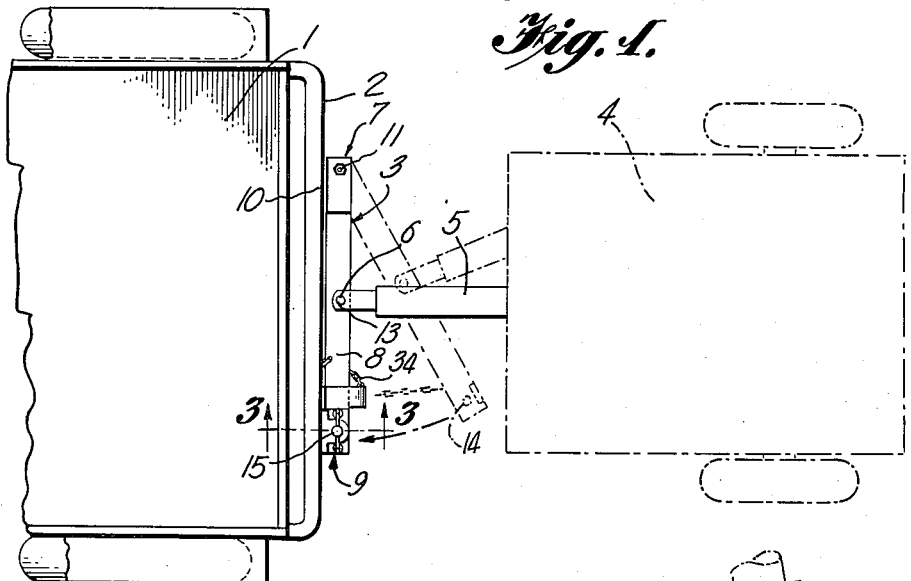
Fig. 1.
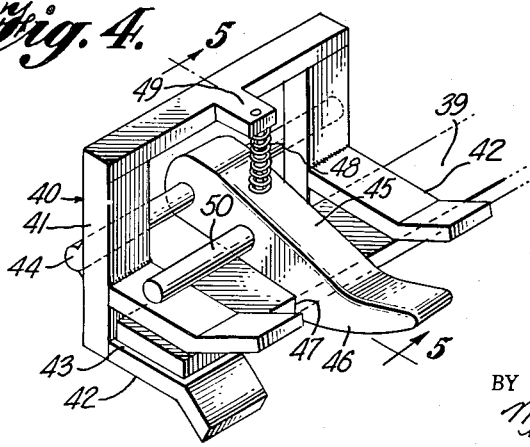
Fig. 2.
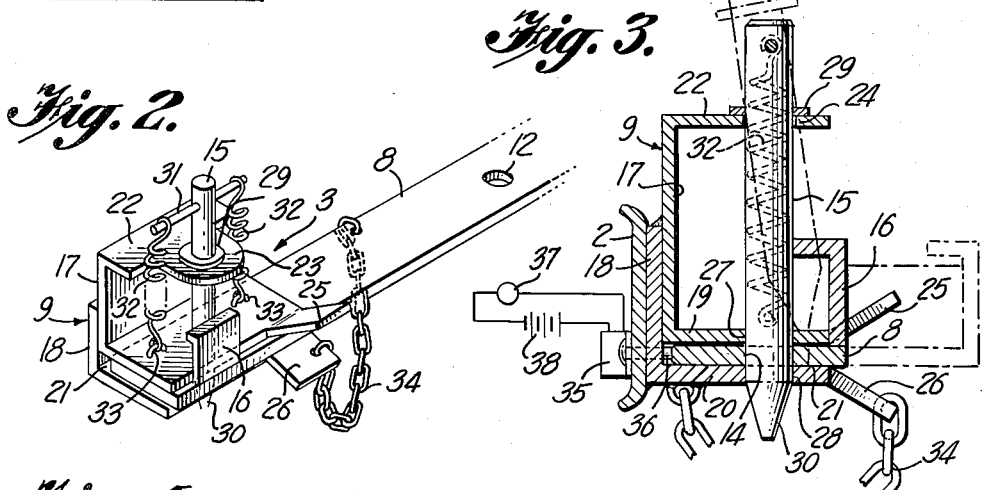
Fig. 3.
Fig. 4.
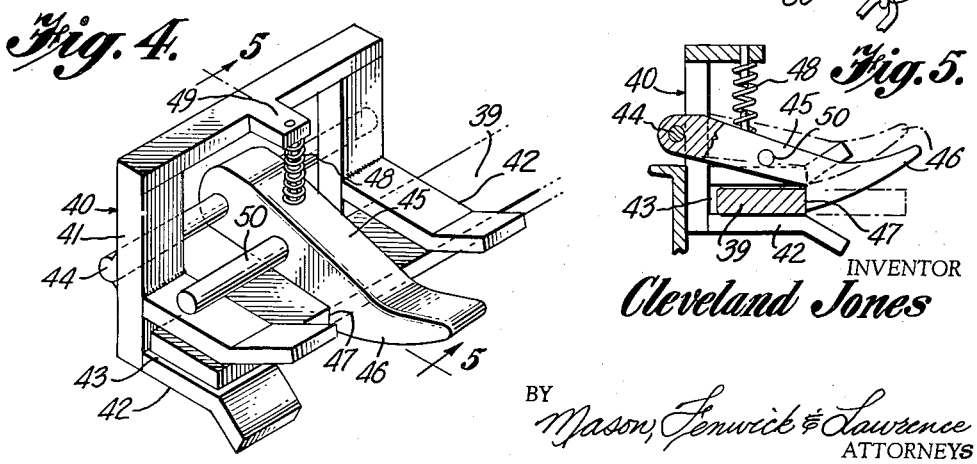
Fig. 5.
INVENTOR
Cleveland Jones
BY
Mason, Fenwick & Lawrence
ATTORNEYS

United States Patent Office 2,970,851
Patented Feb. 7, 1961

2,970,851

HITCH

Cleveland Jones, Inverness, Miss.

Filed Sept. 2, 1960, Ser. No. 53,811

10 Claims. (Cl. 280—478)

This invention relates to hitches, and particularly to hitches of the type used to attach a vehicle to be towed to the back of an automobile, a small truck, and commonly referred to as trailer hitches.

In using a conventional hitch of the type referred to, it is necessary to back the towing vehicle to precise alignment and position relative to the vehicle to be towed, or to manually move the vehicle to be towed into position relative to the towing vehicle in order to connect the elements of the hitch. Either of these procedures is difficult to accomplish, and in most instances it is necessary to move both vehicles before accurate alignment of the hitch elements can be obtained. When the vehicles are on an incline this becomes extremely difficult.

The primary purpose of the present invention is to provide a hitch which can be coupled to a vehicle to be towed without the necessity of precise alignment and positioning of the two vehicles.

A more specific object of the invention is to provide a trailer hitch which will permit coupling of a towing and towed vehicle by making a preliminary connection while the vehicles are separated beyond their normal towing distance, and then automatically locking the vehicles in desired towing relation when the vehicles are brought to proper position.

Another object is the provision of a hitch of this kind which will make it possible for the power of the towing vehicle to be used, after a preliminary connection is made, to bring the two vehicles into proper position for further, and automatic, coupling.

A further object of the invention is to provide means to make it possible to pull the towed vehicle if necessary after a preliminary connection has been made, in order to bring the vehicle to a proper ground grade for final coupling.

Yet another object is to provide a hitch which will have preliminary and final coupling means wherein there will be an indicator to apprise the operator when the hitch is not in its final coupled position.

Other objects of the invention will become apparent from the following description of practical embodiments thereof, when taken in conjunction with the drawings which accompany, and form part of, this specification.

In the drawings:

Figure 1 is a top plan view of portion of a towing vehicle equipped with a hitch of the present invention connected to a towed vehicle;

Figure 2 is a perspective view of the locking end of the hitch;

Figure 3 is a vertical section through the hitch in the region of the locking means, taken on the line 3—3 of Figure 1, and including a diagrammatic showing of a warning device operable by movement of the latch bar of the hitch;

Figure 4 is a perspective view of the locking end of a slightly modified hitch structure; and Figure 5 is a vertical section through the modified hitch taken on the line 5—5 of Figure 4.

In general, the hitch of the present invention contains an element which is attached to a vehicle and has a pivoted latch bar which is swingable, when released, to the position necessary to allow connection to the tow bar of a towed vehicle and to a position where it will be automatically retained in latched condition. The invention includes different types of automatic locking mechanisms, and contemplates the use of an indicator to warn an operator when the hitch is in unlatched position.

Referring to the drawings in detail, and first adverting to that form of the invention shown in Figures 1 through 3, there is shown a portion of a towing vehicle 1, having a back bumper 2, to which a hitch 3 embodying the principles of the present invention is attached. A vehicle 4 to be towed is also shown, and that vehicle has a tow bar 5 having an opening 6 at its outer end to receive a coupling pin for connection to the hitch.

The hitch comprises a mounting bracket 7, a latch bar 8 pivotally connected to the bracket, and a keeper member 9, which includes a trigger type latch which functions automatically, when the latch bar moves to its draft position, to lock the bar against pivotal movement.

The mounting bracket 7 may take any suitable form. It may be a simple angle member having its upstanding flange 10 welded to the towing vehicle bumper 2. The horizontal flange will be drilled to receive a pivot pin 11 for connecting the latch bar 8 to the bracket.

The latch bar is a simple bar, connected at one end to bracket 7, as described, and having a central hole 12 for a coupling pin 13, and an opening 14 adjacent its free end to receive a latch pin 15. A latch trip 16, in the form of an upstanding leg having an inturned toe, is joined to the bar along its edge adjacent the opening 14.

The keeper member 9 is fabricated from a length of angle iron and a length of channel iron welded together, with the web 17 of the channel welded to the vertical flange 18 of the angle and their bottom flanges 19 and 20 being spaced apart to provide a seat 21 for the free end of latch bar 8. The upper flange 22 of the channel may be cut away at the sides as needed, leaving a central section 23 having a central aperture 24 to provide an upper guide for the latch pin 15. The bottom flanges 19 and 20 of the channel and angle are provided with diverging wings 25 and 26 which form an entrance throat to the latch bar seat 21 to lead the latch bar into the seat. Flanges 19 and 20 have openings 27 and 28 in vertical alignment with each other and with opening 24 in top flange 22, to receive the lower end of the latch pin when in bar-locking position. It will be obvious that the keeper may be made in one piece, instead of fabricated as shown.

The latch pin is an elongated member having a collar 29 fixed to it below its top to rest upon the top flange 22 of the keeper and limit the downward movement of the pin. The lower end 30 of the pin is tapered to facilitate its entrance into the holes 27 and 28 in the keeper flanges and hole 14 in the latch bar. An anchor rod 31 is fixed to the pin above the collar and has springs 32 attached to its outer ends. The other ends of the springs are fixed to eyes 33 on the keeper flange 19. It will be evident that the springs will urge the pin downwardly into locking position.

In using the device, the towing vehicle can be backed toward the vehicle to be towed until the hitch is close to the end of tow bar 5. The operator can then lift latch pin 15 to release latch bar 8 so that it can be swung outwardly about its pivot. This will make it possible for the bar to be swung to a position where its opening 12 will register with the hole 6 in the tow bar and coupling pin 13 can be dropped into place. Due to the fact that latch bar 8 is connected to keeper 9 by a chain 34, its outward movement will be limited. This will permit the vehicles to be moved with the latch bar in open position should it be desirable to do so before locking the bar. This is very helpful when the vehicles are on hilly or uneven ground. When the latch pin is lifted to release the bar, it is positioned so that its lower end rests upon keeper flange 19 between the forward edge of that flange and the hole 27 in the flange. The bias of springs 32 will hold the bar in this position. It is simply necessary to back the towing vehicle, therefore, to automatically latch the bar, as the bar will swing about its pivot toward keeper seat 21 as the vehicle moves backward. Trip 16 will strike pin 15, moving it inwardly so that it will drop into hole 27. As the latch bar comes into position with its hole 14 in alignment with hole 27, the pin, under the urge of the springs, will drop through hole 14 and hole 28 in flange 20 of the keeper locking the bar in position.

In some instances, it may be desirable to include a warning device to indicate that the bar is in unlatched position. To this end, a switch 35 may be mounted on the keeper with its button 36 in position to be pressed to open the switch when the bar is in seat 21. The switch may be in circuit with a signal light 37 and the vehicle battery 38 so that whenever the bar is in open position the switch will be closed and the light energized.

In Figures 4 and 5 there is shown a somewhat modified structure wherein a different type latch is used. Here, the bar 39 is pivoted as before, but is not provided with a hole in its free end. The keeper 40 is in the form of a bracket having a mounting portion 41 and outwardly extending ear pairs 42. The ears form a seat 43, which in this case is discontinuous. A pivot pin 44 is carried by the mounting portion of the keeper, and a hook-type latch 45 is mounted upon it. The latch has an inclined outer face 46, which serves as a cam to engage the bar edge, as the bar moves inwardly, to lift the latch and allow the bar to move into its seat. When the bar is seated, the hook face 47 of the latch will engage the outer edge of the bar and hold the bar against movement. The latch is urged into latching position by means of a spring 48 mounted between the latch and a bearing stud 49 projecting from the keeper mounting portion. A limit pin 50 may be carried by the latch to engage one of the ears to prevent the latch from moving too far downward when the bar is released.

It is believed that the operation of the modified hitch will be obvious with a detailed description.

While in the above practical embodiments of the invention have been disclosed, it will be understood that the details of structure shown and described are merely by way of illustration, and the invention may take other forms within the scope of the appended claims.

What is claimed is:

1. A hitch comprising, a mounting bracket and a keeper element having a seat therein for mounting on a towing vehicle in spaced relation, a latch bar pivotally connected to the mounting bracket and having its free end movable into the seat in the keeper element, the latch bar having a coupling pin hole intermediate its ends whereby the bar can be coupled to a tow bar of a vehicle to be towed, and a latch carried by the keeper element and automatically movable to bar-retaining position by movement of the bar into the seat.

2. A hitch as claimed in claim 1 wherein there is means connecting the latch bar to the keeper element to limit the outward movement of the bar away from the keeper.

3. A hitch as claimed in claim 1 wherein there is a warning signal, a circuit connecting the signal to a source of electrical supply, a normally closed switch in the circuit and carried by the keeper member in position to be contacted and opened by the latch bar when in the seat.

4. A hitch as claimed in claim 1 wherein the latch is biased toward bar-latching position.

5. A hitch comprising, a mounting bracket and a keeper element having a seat therein for mounting on a towing vehicle in spaced relation, a latch bar pivotally connected to the mounting bracket and having its free end movable into the seat in the keeper element, the latch bar having a coupling pin hole intermediate its ends whereby the bar can be coupled to a tow bar of a vehicle to be towed, the keeper having a pair of spaced flanges defining the seat with the flanges having aligned openings, an elongated latch pin slidable in a support on the keeper element for movement into and out of the openings, and the latch bar having an aperture therein aligned with the flange openings when the bar is in the seat, whereby the latch pin may move into the aligned flange openings and latch bar aperture to lock the bar in the seat.

6. A hitch as claimed in claim 5 wherein the latch pin is biased toward latched position.

7. A hitch as claimed in claim 5 wherein the latch pin is capable of some lateral inclination in its support to permit the end of the pin to be seated on one of said flanges adjacent the opening therein, and means carried by the latch bar to engage the pin as the bar is moved toward its seat to push the pin into vertical alignment with the flange openings.

8. A hitch as claimed in claim 7 wherein the latch pin is biased toward latched position.

9. A hitch comprising, a mounting bracket and a keeper element having a seat therein for mounting on a towing vehicle in spaced relation, a latch bar pivotally connected to the mounting bracket and having its free end movable into the seat in the keeper element, the latch bar having a coupling pin hole intermediate its ends whereby the bar can be coupled to a tow bar of a vehicle to be towed, a latching hook pivotally mounted upon the keeper member to hook over the latch bar and releasably hold the bar in the seat.

10. A hitch as claimed in claim 9 wherein the latch hook is biased toward latch bar-engaging position.

References Cited in the file of this patent
UNITED STATES PATENTS

| | | |
|---|---|---|
| 1,433,265 | Ferris | Oct. 24, 1922 |
| 1,855,513 | Bulkley | Apr. 26, 1932 |
| 2,341,528 | Clark | Feb. 15, 1944 |